(12) United States Patent
Machnicki et al.

(10) Patent No.: US 8,417,983 B2
(45) Date of Patent: Apr. 9, 2013

(54) ADJUSTING A DEVICE CLOCK SOURCE TO REDUCE WIRELESS COMMUNICATION INTERFERENCE

(75) Inventors: Erik P. Machnicki, San Jose, CA (US); Timothy J. Millet, Mountain View, CA (US); Stephan Vincent Schell, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 286 days.

(21) Appl. No.: 12/960,708

(22) Filed: Dec. 6, 2010

(65) Prior Publication Data

US 2012/0144224 A1 Jun. 7, 2012

(51) Int. Cl.
*G06F 1/00* (2006.01)
*G06F 1/04* (2006.01)
*G06F 3/033* (2006.01)
*H03K 3/03* (2006.01)
*H03K 19/00* (2006.01)
*H03K 9/00* (2006.01)
*H03B 25/00* (2006.01)
*H04L 27/00* (2006.01)
*H04H 20/71* (2008.01)
*H04B 1/38* (2006.01)

(52) U.S. Cl.
USPC ............. 713/500; 713/300; 713/600; 331/46; 331/60; 326/93; 375/295; 375/316; 455/3.01; 455/73; 455/130

(58) Field of Classification Search .................. 713/500, 713/600, 320; 331/46, 60; 326/93; 375/295, 375/316; 455/3.01, 73, 130
See application file for complete search history.

(56) References Cited

U.S. PATENT DOCUMENTS

| | | | |
|---|---|---|---|
| 6,850,754 B2 * | 2/2005 | Nakano | 455/348 |
| 6,999,723 B2 * | 2/2006 | Kusbel et al. | 455/63.1 |
| 7,193,543 B1 | 3/2007 | McLeod et al. | |
| 7,580,691 B1 | 8/2009 | Reed et al. | |
| 7,634,028 B2 | 12/2009 | Crawley | |
| 7,787,569 B2 | 8/2010 | Hayem et al. | |
| 7,793,132 B2 * | 9/2010 | Rofougaran | 713/500 |
| 7,804,920 B2 | 9/2010 | Deisher et al. | |
| 8,253,675 B2 * | 8/2012 | Kim et al. | 345/94 |
| 2009/0138745 A1 | 5/2009 | Dorsey et al. | |

* cited by examiner

*Primary Examiner* — Stefan Stoynov
(74) *Attorney, Agent, or Firm* — Jeffrey C. Hood; Meyertons, Hood, Kivlin, Kowert & Goetzel, P.C.

(57) ABSTRACT

Adjusting a clock source of a device clock to reduce wireless communication (e.g., radio frequency (RF)) interference within a device. The device clock may be derived from an input clock to a serial interface, e.g., coupled to a display, and may be initially driven by a first clock. Later, it may be determined that the serial interface clock is or will interfere with wireless communication. Accordingly, temporary clock signals may be provided to the device clock while the first clock is modified. Once modified, the modified clock signals may be provided to the device clock to reduce wireless communication interference.

25 Claims, 8 Drawing Sheets

ADJUSTING A DEVICE CLOCK SOURCE TO REDUCE WIRELESS COMMUNICATION INTERFERENCE

FIELD OF THE INVENTION

The present invention relates to the field of computers, and more particularly a system and method for adjusting a device clock source to reduce wireless communication interference.

DESCRIPTION OF THE RELATED ART

Modern electronic devices include clocking signals which are used to keep various components of the device in sync. However, in some mobile devices, e.g., mobile phones, the clocking signals may cause interference within a wireless communication channel. This is often exacerbated by the fact that the mobile device will often have to use different communication channels to communicate with different devices and/or according to different communication standards. As a result, there may not be a single "safe" frequency in which the clock can operate. Additionally, the list of safe frequencies may change fairly frequently (e.g., once a second. Accordingly, improvements in clocking signals within devices are desired.

SUMMARY OF THE INVENTION

Various embodiments are presented of a system and method for changing and adjusting a clock source of a device clock to reduce wireless communication interference. For example, the method may be implemented in a wireless device that includes a serial interface (e.g., a high speed serial interface (HSSI) such as mobile industry processor interface (MIPI)) that outputs a serial interface clock that is derived from an input clock. The serial interface clock (e.g., harmonics of the clock) may interfere with wireless communication channels used during wireless communication. However, it should be noted that the wireless communication channels that are used during wireless communication may vary over time (e.g., in response to different external interference, different wireless communication protocols, different wireless devices in communication with the wireless device, etc.). Accordingly, it may be desirable to provide an input clock that results in a serial interface clock that reduces the interference with the wireless communications. However, because the channels of the wireless communication changes over time, the input clock may need to be adjusted dynamically to reduce the interference. However, the adjustment should not interfere with operations of the device (e.g., video of the device). Accordingly, the adjustment should be performed as problem free as possible.

At a first time, first clock signals from the first clock may be provided to the serial interface (e.g., a PHY of the serial interface). Accordingly, at the first time, the serial interface may produce a first serial interface clock based on the first clock signal from the first clock. For example, the first serial interface clock signal may have a frequency that is a multiple of the frequency of the first clock signal. The first clock may be an adjustable clock. For example, the first clock may be produced by a phase locked loop (PLL) whose divider may be changed to produce first clock signals of differing frequencies.

The method may later determine that the first serial interface clock signal is interfering or will interfere with wireless communication of the device. For example, the device may begin (or it may be known that it will shortly begin) communicating using different wireless communication channels, e.g., for a different wireless communication protocol, in response to a change in communication devices (e.g., access point switch over), in response to external interference, etc.

Accordingly, at a second time, the method (e.g., selection logic, which may be controlled by software executing on the device) may switch from providing the first clock signal to providing a second clock signal of a second clock to the serial interface. The switch from providing the first clock signal to providing the second clock signal may be performed in a "glitchless" manner, e.g., using a glitchless mux. Accordingly, at the second time, the serial interface may produce a second serial interface clock that is based on the second clock signal from the second clock. The second clock may be a static clock, e.g., that is used temporarily while the first clock is adjusted to avoid the wireless communication interference. For example, the second clock may be based on a crystal oscillator of the device.

The switch from providing the first clock signal to providing the second clock signal to the serial interface may be performed in response to one or more conditions. For example, where the serial interface clock is used for graphics and display operations (e.g., where it acts as the clock for the display), it may be desirable to wait until a vertical sync of the display is completed before switching. By waiting for a vertical sync, the switch (and future switch below) may not interfere with the video output of the device (e.g., may avoid a visual flicker on the display). Additionally, it may also be desirable to wait until the serial interface enters a low power state (indicating that no other circuitry is currently using the serial interface clock). Thus, in one embodiment, the switch may be performed once both these conditions have been met.

While the second clock signals are provided to the serial interface, the first clock may be adjusted to a different frequency. Accordingly, the first clock may then produce a modified first clock signal.

At a third time, the method may switch from providing the second clock signal to providing the modified first clock signal to the serial interface. Accordingly, at the third time, the serial interface may generate a third serial interface clock signal based on the modified first clock signal. The third serial interface clock signal may have reduced interference with the wireless communication of the device. Similar to above, this switch may be performed after a low power state of the serial interface. Note that the speed of the modification and second switch may be fast enough that it may not be necessary to wait for another vertical sync of the display.

The method described above may be performed by selection circuitry or logic. In one embodiment, the selection circuitry may be controlled by software executing on the device. In one embodiment, the specific method elements performed may be controlled according to a state machine.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory media which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
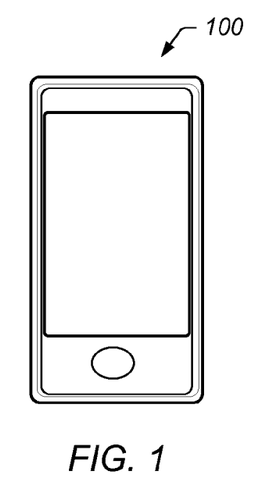
FIG. 1 illustrates an exemplary system for implementing various embodiments of the present invention.
Figure 2:
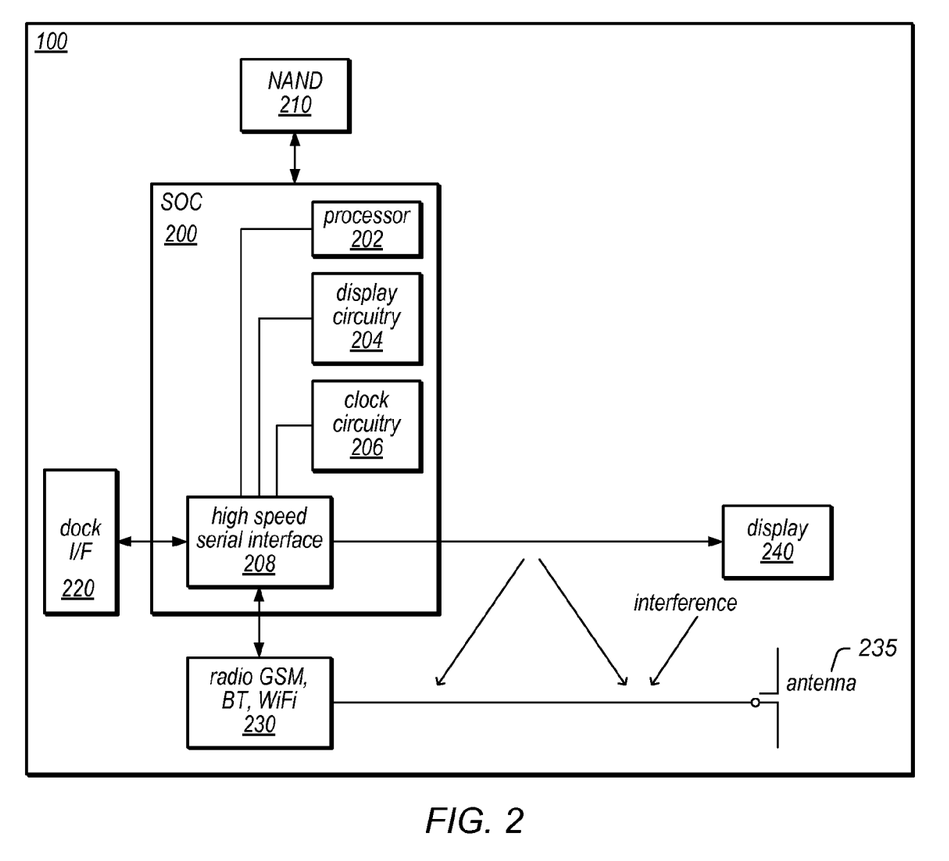
FIG. 2 is an exemplary block diagram of the system of FIG. 1, according to one embodiment.

FIGS. 1 and 2—Exemplary System and Block Diagram

FIG. 1 illustrates an exemplary device 100, which may implement embodiments described herein. The device 100 may be any of various devices. For example, the device 100 may be a portable or mobile device, such as a mobile phone, PDA, audio/video player, etc. In embodiments described herein, the device 100 may be configured to communicate with other devices (e.g., other wireless devices, wireless peripherals, cell towers, access points, etc.) using one or more wireless channels. As used herein, a "wireless device" refers to a device that is able to communicate with other devices or systems using wireless communication. For example, the device 100 may be configured to utilize one or more wireless protocols, e.g., 802.11x, Bluetooth, WiMax, CDMA, GSM, etc., in order to communicate with the other devices wirelessly. The device 100 may also be configured to adjust and/or change input clocking signals within the device 100 in order to reduce (or eliminate) interference with communication using the wireless channels.

As also shown in FIG. 1, the device 100 may include a display, which may be operable to display graphics provided by an application executing on the target device 100. The application may be any of various applications, such as, for example, games, internet browsing applications, email applications, phone applications, productivity applications, etc. The application may be stored in a memory medium of the device 100. The device 100 may include a central processing unit (CPU) and a graphics processing unit (GPU) which may collectively execute these applications.

FIG. 2 illustrates an exemplary block diagram of the device 100. As shown, the device 100 may include a system on chip (SOC) 200, which may include portions for various purposes, including processor 202, display circuitry 204, and clock circuitry 206, which may all be coupled to serial interface 208 (e.g., a high speed serial interface (HSSI), such as a mobile industry processor interface (MIPI)). The HSSI 208 may provide information to the display 240, including an HSSI clock signal. For example, the display 240 may display graphics according to the HSSI clock signal.

In addition to the SOC 200, the device 100 may include various types of memory, e.g., including NAND 210, a dock interface 220, the display 240, and wireless communication circuitry (e.g., for GSM, Bluetooth, WiFi, etc.) which may use antenna 235 to perform the wireless communication. As shown, there may be interference between the signals provided from the HSSI 208 to the display 240 and the wireless communications using the antenna. For example, the HSSI clocking signals (e.g., harmonics of the HSSI clocking signals) may interfere with one or more wireless communication channels used by the radio 230. Accordingly, as described below, this interference may be mitigated or reduced by adjusting the HSSI clocking signals.

Figure 3:
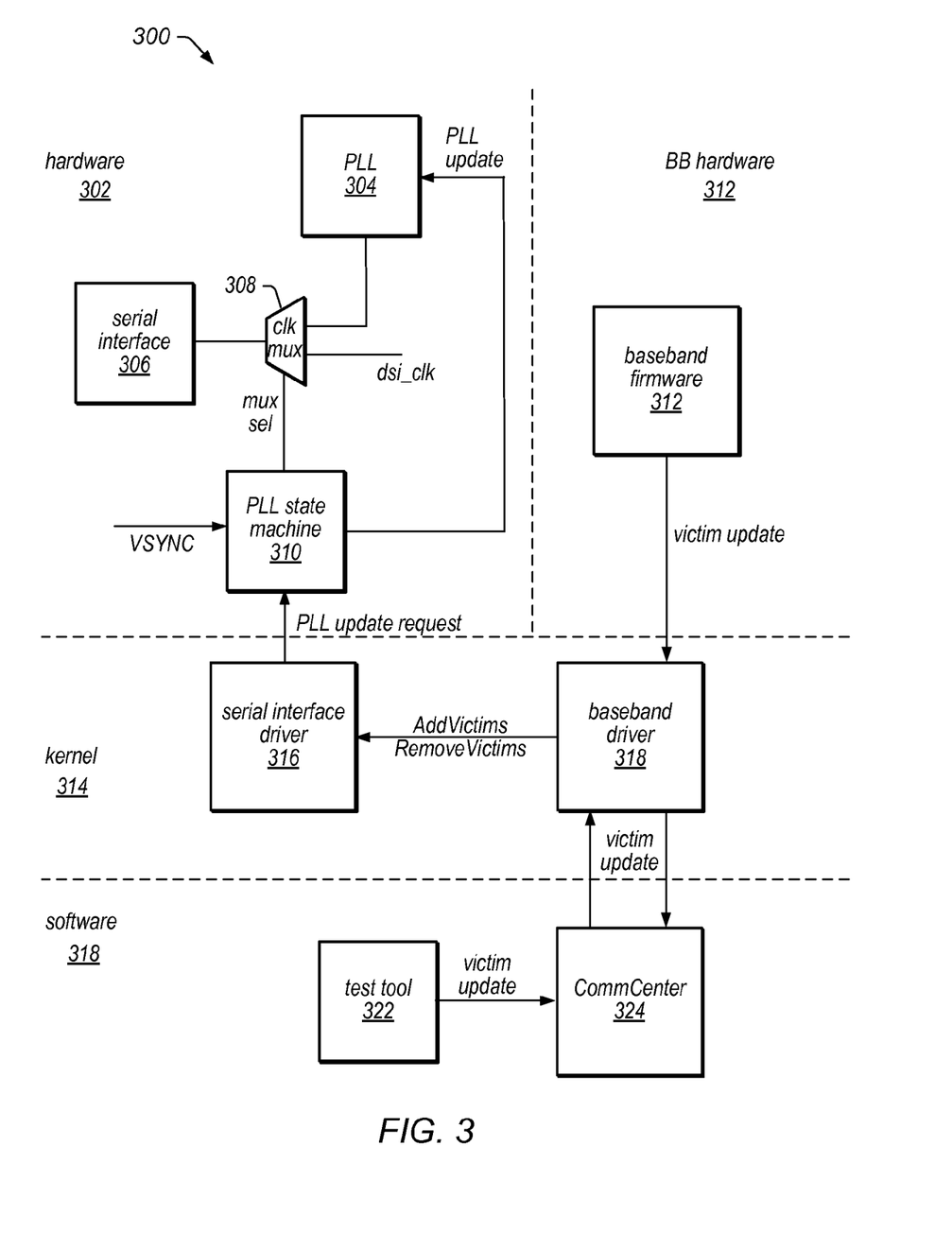
FIG. 3 is an exemplary block diagram of the system of FIG. 1, including hardware and software components, according to one embodiment.

FIG. 3—Exemplary Block Diagram of Selection Logic

FIG. 3 illustrates various hardware and software logic that may be used to reduce or remove wireless interference in the device 100.

More particularly, as shown, hardware 302 may include serial interface 306 which may receive clocking signals from PLL 304 (also referred to herein as "first clock", or "adjustable clock") or dsi_clock (also referred to herein as "second clock" or "static clock") via mux 308, which may be a glitchless mux. As shown, the output clock of the mux 308 may be selected according to a selection by the PLL state machine 310, which may also modify the PLL 304 frequency, as desired. The PLL state machine 310 may receive vertical sync (VSYNC) notifications and PLL update requests as inputs.

The kernel 314 may include a serial interface driver 316 which may provide the PLL update requests to the PLL state machine 310. Further, the kernel may include a baseband driver 318 which may communicate with both the serial interface driver 316 (providing or removing wireless communication interference frequencies, also referred to as "victims" or "victim frequencies") and baseband firmware 312 (in baseband hardware 312). The baseband firmware 312 may provide victim updates to the baseband driver 318. Note that the victim frequencies may not just cover the strict wireless channels (e.g., RF channels) being used, but may also include sufficient margin to protect against clock harmonics of the serial interface clock.

In addition to the hardware and kernel, the software 318 may also interact with the clock adjustment system. More particularly, a test tool 322 may provide victim updates to communication center 324, which may in turn provide and receive victim updates to/from the baseband driver 318. The following describes exemplary operation of the system of FIG. 3.

At boot or resume from suspend to RAM, the clock mux 308 may select the dsi_clk. This clock sets the nominal frequency for the serial interface 306 and all the PLL 304 clock frequencies used may be near it. Exemplary frequencies are 342 MHz and 513 MHz. At this time, the list of victim frequencies maintained by the serial interface driver 316 may be empty and the list of victim frequencies maintained by the communication center 324 may be cleared in order to be up to date.

Later, the baseband firmware 312, having determined that the wireless communication radios will be depending on different victim frequencies in the near future, may send an updated list of victim frequencies to communication center 324 via baseband driver 318. The communication center 324 may modify the victim update from the baseband firmware 312 or pass it along as is to the baseband driver 318.

Accordingly, the baseband driver may either add or remove victim frequencies to/from the serial interface driver 316. The serial interface driver 316 may accordingly update its list of active victim frequencies and then search a list of possible PLL frequencies to find the safest choice (e.g., one that removes or reduces wireless communication interference of the victim frequencies).

If the safest choice of the PLL frequency has changed, the serial interface driver 316 may send a PLL update request to the PLL state machine 310. When a PLL update request is pending, the PLL state machine may wait for the next VSYNC from the display subsystem. After the VSYNC signal is received, the PLL State Machine may switch the clock mux 308 to the dsi_clk and update the PLL settings to begin the locking process. After the PLL 304 has locked at the new frequency, the clock mux 308 may be changed back to the PLL 304. While the actual lock time depends on PLL design, it may occur in less then 100 μs.

In one embodiment, once the adaptive clocking function has been registered, it may be called at any time, regardless of the state of the display. Further, PLL update requests may only be sent to the hardware while the display is on. Additionally, the Baseband/CommCenter may keep sending updates while the display is off, so that if the display needs to be turned on, the serial interface driver 316 can select an appropriate PLL frequency before turning on the display. It should be noted that while there is no specific limit to how often AddVictim or RemoveVictim can be sent, it is not efficient to send the updates too frequently. For example, the hardware may only be able to react to updates at the frame rate of the display. Accordingly, to further limit the overhead of adaptive clocking, updates should be sent no more frequently then once a second.

The test tool 322 may allow updates to be inserted by a test tool running on the device. Thus, the test tool may be able to use the same interface as the driver to simulate the system's life cycle and verify correct operation. In addition to offline testing, the serial interface driver may also export the current PLL frequency and victim frequencies.

Figure 4:
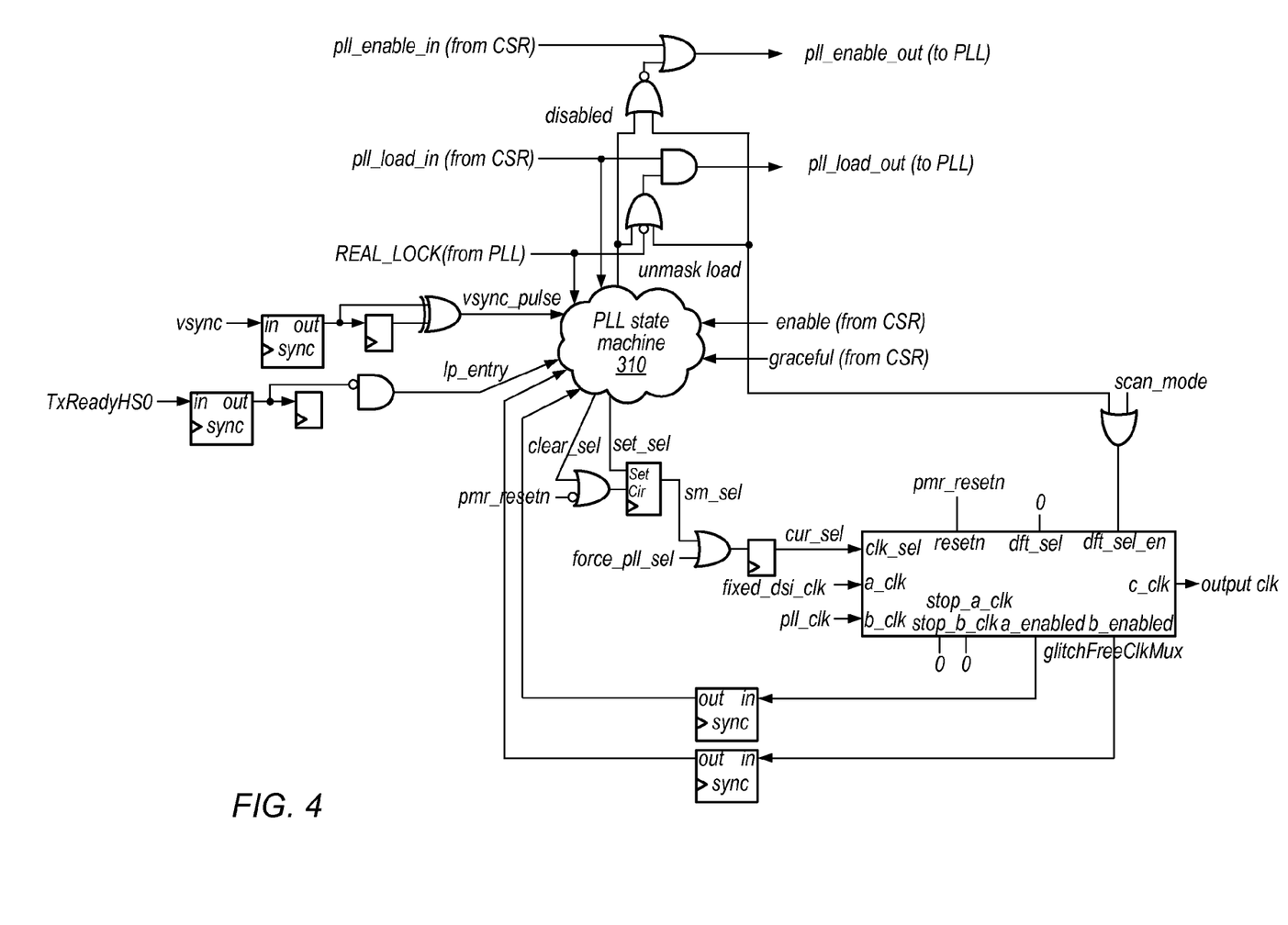
FIG. 4 is an exemplary diagram for controlling clock signals using a state machine, according to one embodiment.
Figure 5:
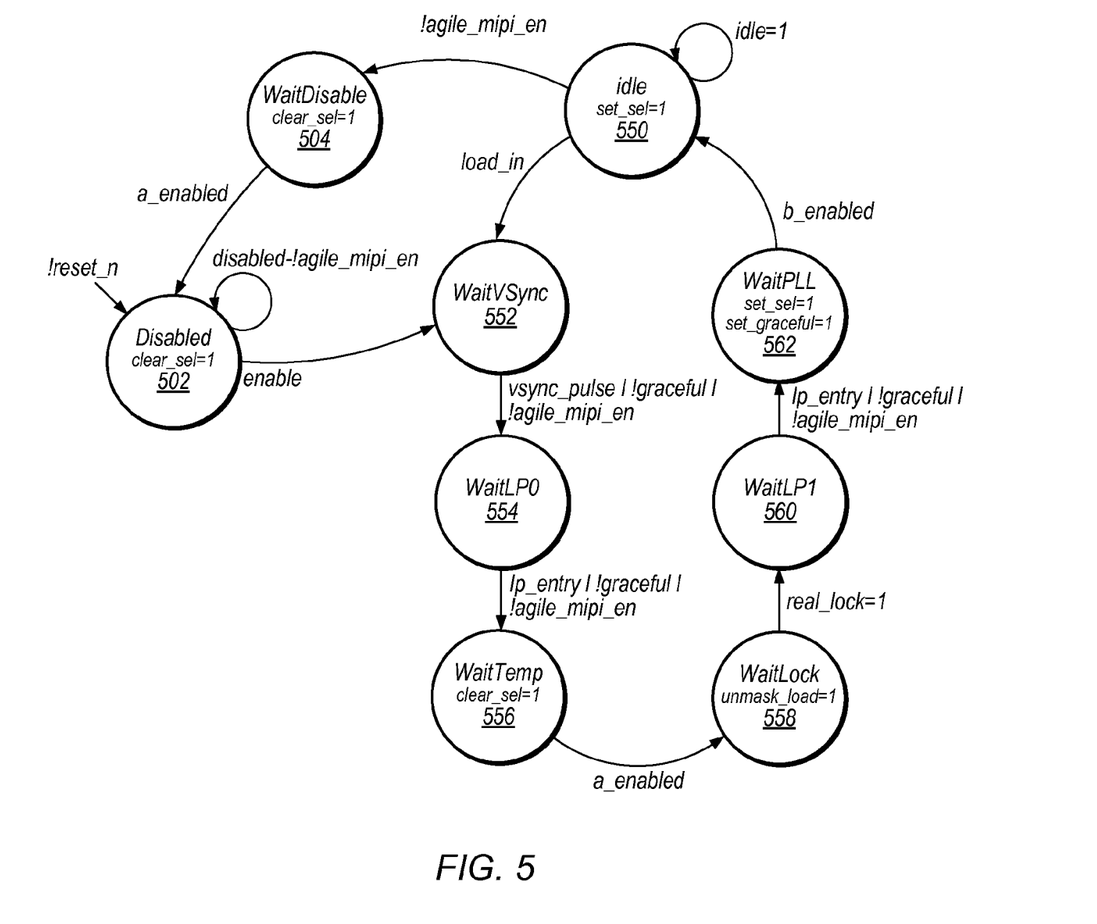
FIG. 5 is an exemplary state diagram corresponding to the state machine in FIG. 4, according to one embodiment.
Figure 6:
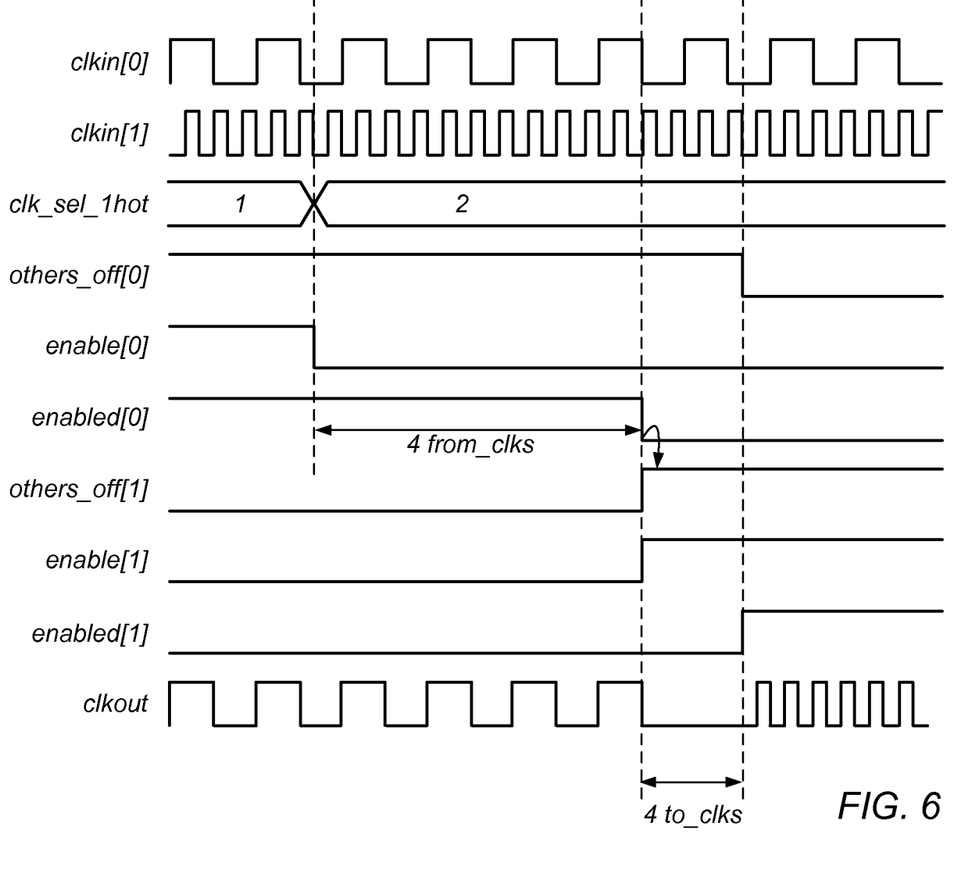
FIG. 6 is a timing diagram corresponding to the operation of FIGS. 4 and 5, according to one embodiment.

FIGS. 4-6—Exemplary Block Diagram, State Machine, and Timing Diagram

FIGS. 4 and 5 illustrate a more specific block diagram of the state machine and various inputs and outputs for controlling the serial interface clock.

As shown in FIG. 4, the PLL state machine 310 may be coupled to the various inputs and outputs for controlling the output clock provided to the serial interface 306. More particularly, the PLL state machine 310 may have various modes that may be set in response to input, e.g., enabled (whether to operate or not) and graceful, which may indicate whether to change states immediately or whether to wait on various other factors, such as vertical syncs and low power states. The PLL state machine 310 may also receive a vsync pulse indicating when a vsync occurs. The PLL state machine 310 may also receive indications of whether the serial interface 306 is in low power mode or not (e.g., via lp_entry) and whether the PLL clock is locked.

Additionally, The PLL state machine 310 may control whether the PLL 304 is disabled. Finally, the PLL state machine 310 may control selection between the two clocks (fixed_dsi_clk and pll_clk) via the glitchless mux ("glitchFreeClkMux"), which may provide the output clock to the serial interface 306.

FIG. 5 illustrates an exemplary state diagram which may describe the operation of the PLL state machine 310. More particularly, as shown, the PLL state machine 310 may be in disabled state 502 or enabled states 550-562, with a transitory disabling state 504. When leaving idle 550 or disabled 502, the state machine may enter WaitVSync 552 while waiting for the next vertical sync. Once a vsync has been detected (assuming graceful mode is turned on), the state may change to WaitLP0 554, where it waits for a low power state of the serial interface 306. Once the low power state has been entered, the state changes to WaitTemp 556, which waits for the static clock signal. When this is ready, the static clock is used and the state changes to WaitLock 558, where the PLL clock is changed to a new, safe frequency. When lock is achieved, the state is changed to WaitLP1 560, where it waits for a low power state of the serial interface 306. Once the low power state is reached, the state changes to WaitPLL 562 where the new PLL clock signals are waited for. Once they are received, the PLL clock is enabled and the state returns to idle 550. From idle 550, the state may be changed to disabled 504 (stopping the PLL clock changes) via WaitDisable 504, or, in response to a detected conflict in PLL clock frequency and wireless communication, the change of PLL clock process 552-562 may be repeated.

This scheme is desirable because the device may not be able to tolerate the output clock from the mux 308 being off for an extended period of time while the PLL relocks. Thus, using the methods described herein, whenever the clock of mux 308 is switched between the PLL and fixed clock and back, the output clock will be flatlined, but only for a short period of time (e.g., about 8 ns). During the relock period, the output clock will be running off the fixed clock, which could be running at an interference frequency. However, it only runs off the fixed clock for a relatively short time (e.g., up to 100 us), and during this time, the display is in the vertical blanking period, so there should be no data on the byte lanes to cause interference. Note that it is not sufficient to wait for a vertical blanking period, since even during those periods, HSync packets may be sent on the serial interface. To avoid corruption of these packets, the logic waits until the serial interface has gone into low power mode on the transmission line before switching the clock source.

FIG. 6 illustrates the different clocks and transitions in a timing diagram. As shown, when the output clock of the mux 308 switches between the PLL clock and the fixed clock, the output is flatlined for a brief period of time (e.g., 3-4 to_clks), where the to_clk is the newly selected clock. Assuming a 513 MHz to_clk, the clock will be flatlined for approximately 8 ns.

Figure 7A:
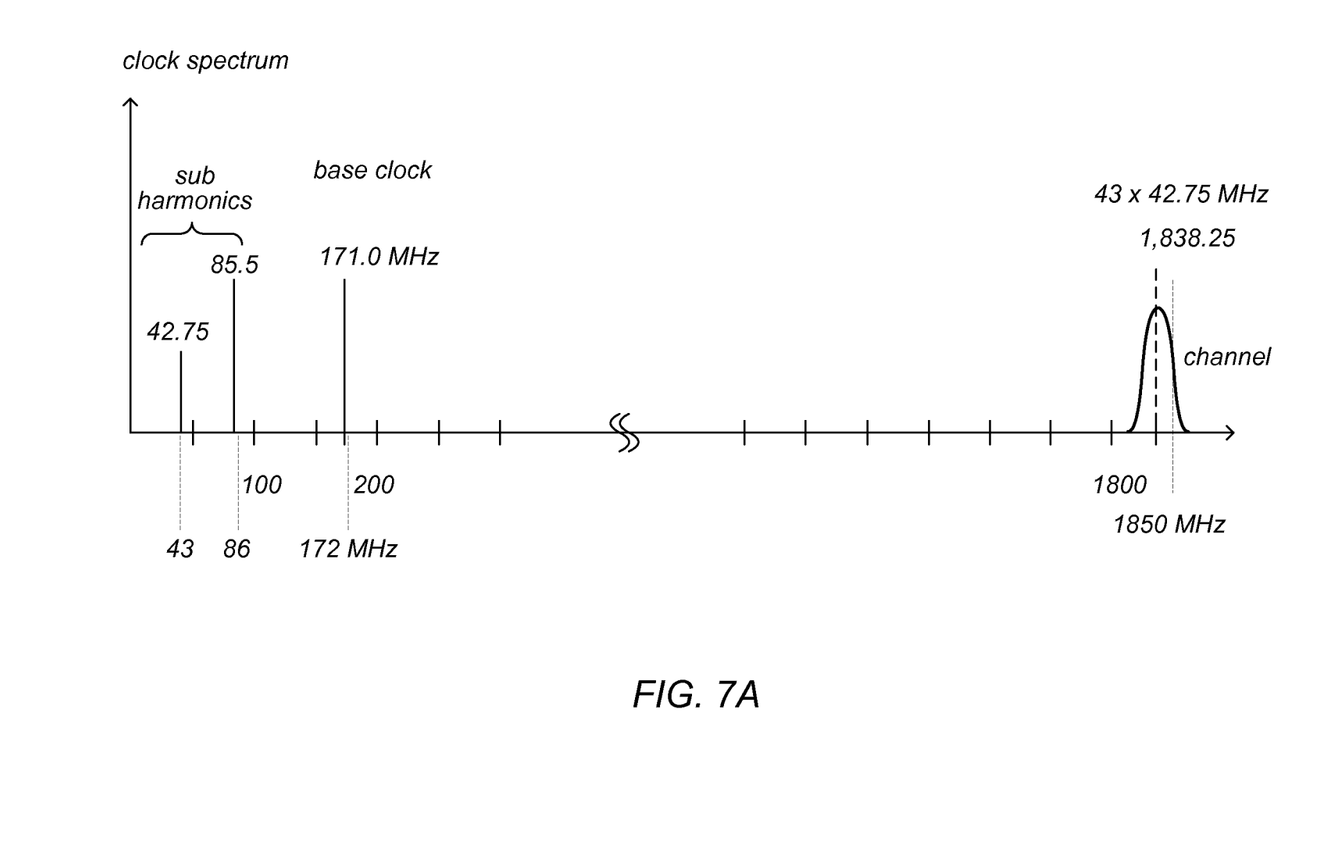
FIGS. 7A and 7B are exemplary interference diagrams before and after clock source adjustment, according to one embodiment.
Figure 7B:
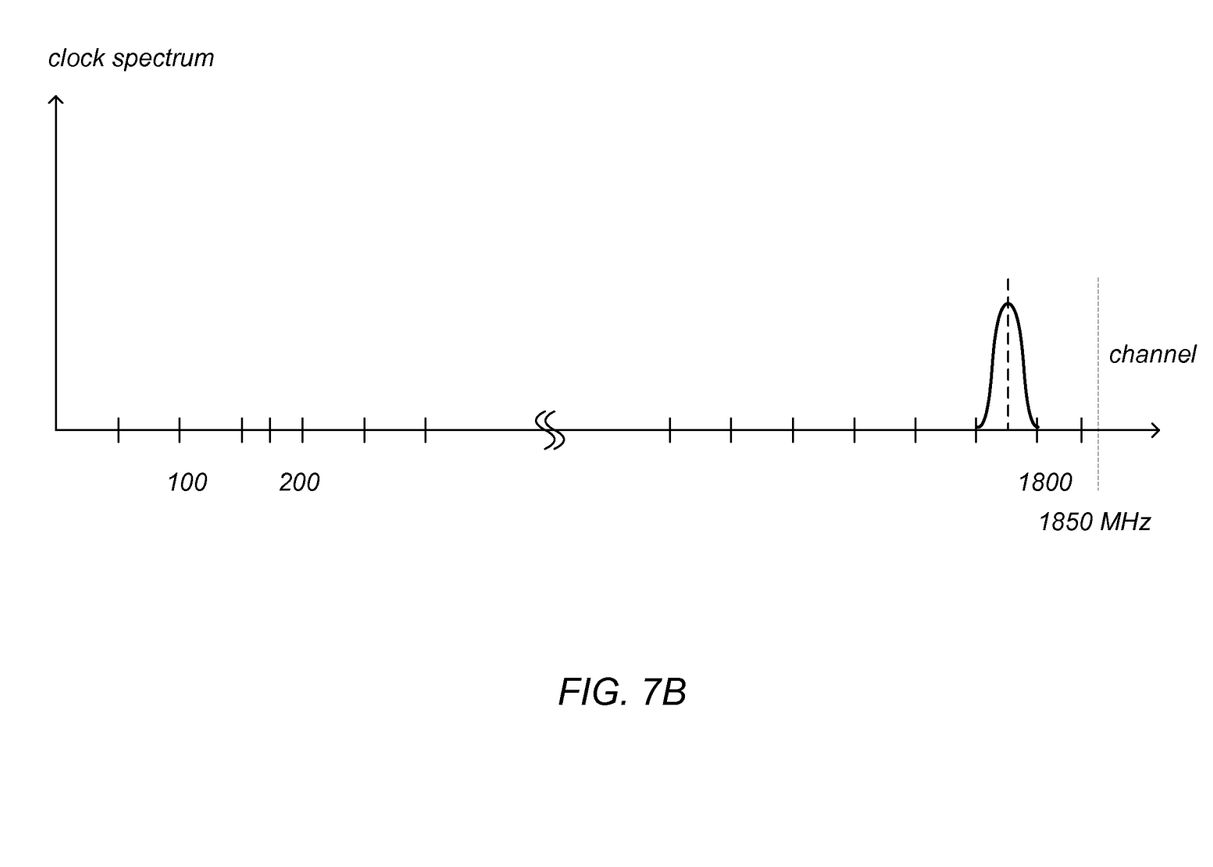

FIGS. 7A and 7B—Exemplary Wireless Interference

Finally, FIGS. 7A and 7B illustrate an exemplary clock frequency interference pattern before and after modification. More particularly, in FIG. 7A, a base clock at 171 MHz is used, which has sub harmonics at 85.5 and 42.75 MHz. In this particular example, the interference results from multiples of the $4^{th}$ sub-harmonic (171/4 MHz). In this example, only the $43^{rd}$ overtone of the 42.75 MHz sub harmonic is shown, which interferes with the 1850 MHz wireless channel. A more complete drawing would show a spectral line every 42.75 MHz, with a decreasing intensity as the frequency goes up. In this example, the power level on these spectral lines is in the −80 to −100 dB range.

As shown in FIG. 7B, this interference is greatly reduced using the techniques described herein. More particularly, as shown, the interfering frequency from the HSSI clock has been moved to a frequency that has limited or no interference with the 1850 MHz wireless channel. Note that only the interference band in question is shown in this Figure.

Figure 8:
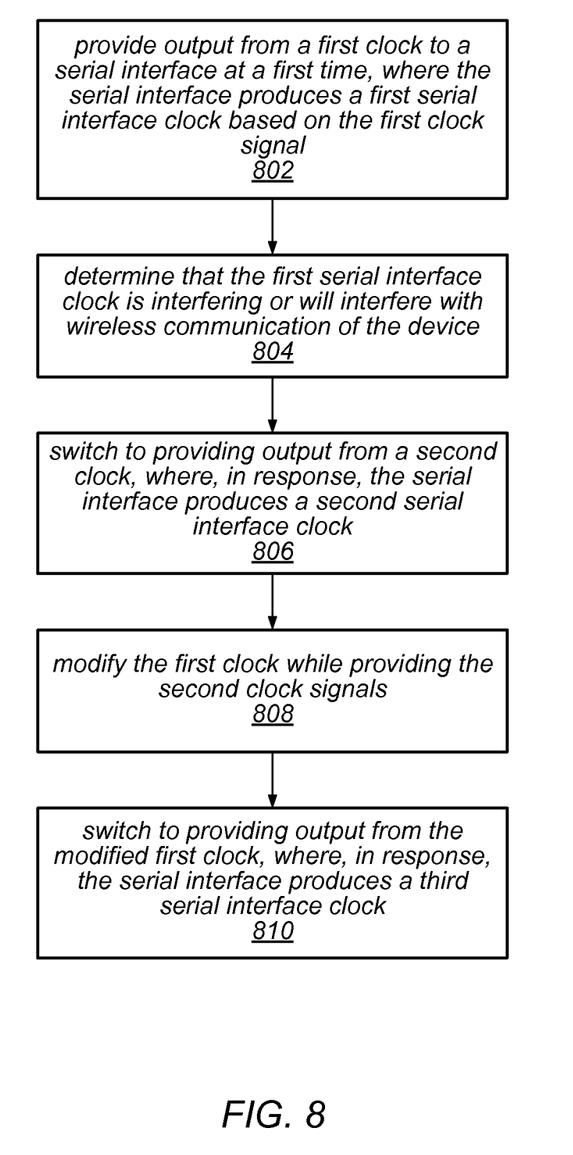
FIG. 8 is a flowchart diagram illustrating one embodiment of a method for changing a clock source to reduce wireless communication interference.

FIG. 8—Modifying a Clock Source to Mitigate Wireless Communication Interference FIG. 8 illustrates a method for modifying a clock source of a serial interface to mitigate wireless communication interference. The method shown in FIG. 8 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 802, at a first time, first clock signals from the first clock (e.g., the PLL clock from above) may be provided to a device clock. The device clock may be part of a serial interface (and may thus be a serial interface clock). Accordingly, the first clock signals may be provided to the serial interface (e.g., a PHY of the serial interface). For the remainder of this description, it will be assumed that the clock signals are provided to the serial interface, but these embodiments also apply to any type of device clock, as desired. Accordingly, at the first time, the serial interface may produce a first serial interface clock based on the first clock signal from the first clock. For example, the first serial interface clock signal may have a frequency that is a multiple of the frequency of the first clock signal. The first clock may be an adjustable clock. For example, the first clock may be produced by a PLL whose divider may be changed to produce first clock signals of differing frequencies.

In 804, the method may later determine that the first serial interface clock signal is interfering or will interfere with wireless communication of the device. For example, the device may begin (or it may be known that it will shortly begin) communicating using different wireless communication channels, e.g., for a different wireless communication protocol, in response to a change in communication devices (e.g., access point switch over), in response to external interference, etc. As indicated above, this may be determined by setting a set of victim frequencies that are compared against the frequencies of the first serial interface clock. If these overlap, the frequency of the serial interface clock should be modified to reduce interference.

Accordingly, in 806, at a second time, the method may switch from providing the first clock signal to providing a second clock signal of a second clock to the serial interface. The switch from providing the first clock signal to providing the second clock signal may be performed in a "glitchless" manner, e.g., using a glitchless mux. Accordingly, at the second time, the serial interface may produce a second serial interface clock that is based on the second clock signal from the second clock. The second clock may be a static clock, e.g., that is used temporarily while the first clock is adjusted to avoid the wireless communication interference. For example, the second clock may be based on a crystal oscillator of the device.

The switch from providing the first clock signal to providing the second clock signal to the serial interface may be performed in response to one or more conditions. For example, where the serial interface clock is used for graphics and display operations (e.g., where it acts as the clock for the display), it may be desirable to wait until a vertical sync of the display is completed before switching. By waiting for a vertical sync, the switch (and future switch below) may not interfere with the video output of the device (e.g., may avoid a visual flicker on the display). Additionally, it may also be desirable to wait until the serial interface enters a low power state (indicating that no other circuitry is currently using the serial interface clock). Thus, in one embodiment, the switch may be performed once both these conditions have been met.

In 808, while the second clock signals are provided to the serial interface, the first clock may be adjusted to a different frequency. Accordingly, the first clock may then produce a modified first clock signal.

In 810, at a third time, the method may switch from providing the second clock signal to providing the modified first clock signal to the serial interface. Accordingly, at the third time, the serial interface may generate a third serial interface clock signal based on the modified first clock signal. The third serial interface clock signal may have reduced interference with the wireless communication of the device. Similar to above, this switch may be performed after a low power state of the serial interface. Note that the speed of the modification and second switch may be fast enough that it may not be necessary to wait for another vertical sync of the display.

The method described above may be performed by selection circuitry or logic, such as that shown in previous Figures. As used herein, "selection logic" may refer to hardware and/or software that is used to perform selection and modifications to the input clocks of the serial interface, e.g., based on various conditions. In one embodiment, the selection logic may include selection circuitry that may be controlled by software executing on the device. In one embodiment, the specific method elements performed may be controlled according to a state machine, which may be implemented in software and/or hardware.

Thus, as described herein, the system may automatically modify a source clock (e.g., dynamically or "on the fly") of the serial interface clock to one that results in a serial interface clock reduces or removes wireless communication interference by the serial interface clock.

Exemplary Frequency Selection

This section describes an exemplary algorithm that may be used to select the safest first clock frequency given the current set of victim frequencies. Based the configuration and operating range of the display circuitry and selection of radio bands, there will be a range of PLL frequencies available. For the 513 MHz nominal frequency, that range is approximately 505 MHz to 515 MHz.

The design of the PLL only allows usage of a subset of the allowed range:

$P=\{P1, P2, P3, \ldots, Pn\}$

There will typically be 50 to 200 PLL frequencies in P. Based on the AddVictim and RemoveVictim commands, a set of victim frequency and corresponding bandwidths may be maintained:

$V=\{V1, V2, V3, \ldots, Vm\}$ $B=\{B1, B2, B3, \ldots, Bm\}$

The number of frequencies in V depends on the current state of the radios, but will typically be less then 40.

To select a safe PLL frequency a Pj from P must be found such that following is true for all Vk in V:

$\text{Floor}((Vk-Bk)/Pj)=\text{Floor}((Vk+Bk)/Pj)$

In some embodiments, the Vk in V may be evaluated starting with the highest priority. The search for a safe frequency has a complexity of O(n2). This is not ideal as sizes of P and V could become large enough to cause significant overhead. If necessary, the implementation can maintain a subset of P that are valid for the current V and only perform incremental updates to the subset of P based on AddVictim and RemoveVictim commands.

Further Embodiments

Note that while the above has been described with respect to a HSSI, the ability to change the frequency of clocks may also apply to memory controllers, CPUs (e.g., for fine grain control of CPU clocks), GPUs, FMIs, or as a source to any type of PLL, as desired. The above approach may allow for fine grain (e.g., in the kHz order of magnitude) adjustment of clock sources to avoid frequency collisions. Additionally, the modulator can be programmed to different profiles or frequencies, as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for switching clock inputs for a device clock within a device, comprising:
    providing, by a first clock, a first clock signal to the device clock at a first time, wherein, at the first time, the device clock generates a first device clock signal based on the first clock signal from the first clock;
    determining that the first device clock signal from the device clock is interfering or will interfere with wireless communication of the device;
    in response to determining that the first device clock signal from the device clock is interfering or will interfere with wireless communication of the device:
        switching from providing the first clock signal from the first clock to the device clock to providing a second clock signal from a second clock to the device clock at a second time, wherein, at the second time, the device clock generates a second device clock signal based on the second clock signal from the second clock;
        modifying a frequency of the first clock signal to produce a modified first clock signal, wherein said modifying is performed while the second clock signal is provided from the second clock to the device clock;
        switching from providing the second clock signal from the second clock to the device clock to providing the modified first clock signal from the first clock to the device clock at a third time, wherein, at the third time, the device clock generates a third device clock signal based on the modified first clock signal, wherein the third device clock signal has reduced interference with wireless communication of the device.

2. The method of claim 1, wherein the clocking signals from the device clock are used to control video output of the device, wherein said switching from providing the first clock signal to providing the second clock signal, said modifying the frequency of the first clock signal, and said switching from providing the second clock signal to providing the modified first clock signal does not interrupt video output of the device.

3. The method of claim 2, further comprising:
    after said determining, determining a next vertical sync of a display of the device, wherein said switching from providing the first clock signal to providing the second clock signal is performed after the next vertical sync.

4. The method of claim 1, wherein said switching from providing the first clock signal to providing the second clock signal and said switching from providing the second clock signal to providing the modified first clock signal is performed in a glitchless manner.

5. The method of claim 1, wherein the device clock is comprised in a serial interface of the device, wherein said switching from providing the first clock signal to providing the second clock signal and said switching from providing the second clock signal to providing the modified first clock signal does not interrupt video output of the device is performed during a low power mode of the serial interface.

6. The method of claim 1, wherein the device clock is comprised in a high speed serial interface (HSSI) of the device.

7. The method of claim 6, wherein the HSSI comprises a mobile industry processor interface (MIPI).

8. A clock selection system for modifying a device clock within a device, comprising:
- a first input for receiving a first clock signal from a first clock;
- a second input for receiving a second clock signal from a second clock;
- an output for providing the first clock or the second clock as output to the device clock; and
- selection circuitry, wherein the selection circuitry is configured to:
  - provide a first clock signal to the device clock at a first time, wherein, at the first time, the device clock generates a first device clock signal based on the first clock signal from the first clock;
  - determine that the first device clock signal from the device clock is interfering or will interfere with wireless communication of the device;
  - provide a second clock signal from the second clock to the device clock at a second time based on said determining, wherein, at the second time, the device clock generates a second device clock signal based on the second clock signal from the second clock;
  - modify a frequency of the first clock signal to produce a modified first clock signal, wherein said modifying is performed while the second clock signal is provided from the second clock to the device clock;
  - provide the modified first clock signal from the first clock to the device clock at a third time, wherein said providing is performed in response to the modification of the frequency of the first clock and the determination that the first clock signal from the device clock is interfering or will interfere with wireless communication of the device, wherein, at the third time, the device clock generates a third device clock signal based on the modified first clock signal, wherein the third device clock signal has reduced interference with wireless communication of the device.

9. The clock selection system of claim 8, wherein the second clock is a static clock.

10. The clock selection system of claim 8, wherein the device clock is comprised in a serial interface.

11. The clock selection system of claim 10, wherein the change from providing the first clock signals to the second clock signals and the change from providing the second clock signals to the modified first clock signals is performed during a low power state of the serial interface.

12. The clock selection system of claim 10, wherein the serial interface is a high speed serial interface.

13. The clock selection system of claim 10, wherein the clock selection circuitry is further configured to:
- determine a vertical sync of the device, wherein the device clock is used to control video of the device;
- wherein changing from providing the first clock signals to providing the second clock signals at the second time is performed after the vertical sync.

14. The clock selection system of claim 8, further comprising:
- a glitchless mux that is coupled to the first input, the second input, and the output, wherein the glitchless mux is configured to perform the change from providing the first clock signals to the second clock signals and the change from the second clock signals to the modified first clock signals.

15. The clock selection system of claim 8, wherein the selection circuitry is controlled via software executing on the device.

16. The clock selection system of claim 8, wherein the selection circuitry comprises a state machine, wherein the state machine is configured to control said providing the first clock signal, said determining, said providing the second clock signal, said modifying, and said providing the modified first clock signal.

17. A mobile device, comprising:
- a display;
- display circuitry coupled to the display, wherein the display circuitry is configured to control graphics output to the display of the mobile device;
- a high speed serial interface (HSSI) coupled to the display circuitry, wherein the HSSI produces a HSSI clock based on an input clock signal, wherein the display circuitry operates according to the HSSI clock signal;
- an antenna for performing wireless communication using a plurality of wireless channels, wherein harmonics of the HSSI clock signal overlap with one or more of the wireless channels;
- a first clock, wherein the first clock is configured to output a first clock signal, wherein the first clock is an adjustable clock;
- a second clock, wherein the second clock is configured to output a second clock signal, wherein the second clock signal is a constant clock; and
- selection logic coupled to the first clock and the second clock, wherein the selection logic is configured to:
  - provide the first clock signal to the device clock at a first time, wherein, at the first time, the HSSI generates a first HSSI clock signal based on the first clock signal from the first clock;
  - determine that the first HSSI clock signal from the HSSI is interfering or will interfere with wireless communication of the mobile device;
- wherein in response to determining that the first HSSI clock signal from the HSSI is interfering or will interfere with wireless communication of the mobile device, the selection logic is configured to:
  - wait for completion of a vertical sync of the display;
  - wait for the HSSI to enter a first low power state;
  - switch from providing the first clock signal from the first clock to the device clock to providing a second clock signal from a second clock to the device clock at a second time in response to the completion of the vertical sync of the display and the first low power state of the HSSI, wherein, at the second time, the HSSI generates a second HSSI clock signal based on the second clock signal from the second clock;
  - modify a frequency of the first clock signal to produce a modified first clock signal, wherein said modifying is performed while the second clock signal is provided from the second clock to the HSSI;
  - wait for the HSSI to enter a second low power state; and
  - switch from providing the second clock signal from the second clock to the device clock to providing the modified first clock signal from the first clock to the HSSI at a third time, wherein, at the third time, the HSSI generates a third HSSI clock signal based on the modified first clock signal, wherein the third HSSI clock signal has reduced interference with wireless communication of the device.

18. The mobile device of claim 17, further comprising:
- a processor; and
- memory coupled to the processor, wherein the memory stores program instructions executable by the processor to control the selection logic.

19. The mobile device of claim 17, wherein the selection logic comprises a state machine, wherein performance of the selection logic is controlled by the state machine.

20. The mobile device of claim 17, wherein the HSSI comprises a mobile industry processor interface (MIPI).

21. The mobile device of claim 17, wherein the selection logic is configured to provide first clock signal, the second clock signal, and the modified first clock signal to a PHY of the HSSI.

22. A method for switching clock inputs for a serial interface within a device, comprising:
   providing, by a first clock, a first clock signal to the serial interface at a first time, wherein, at the first time, the serial interface generates a first serial interface clock signal based on the first clock signal from the first clock;
   determining that the first serial interface clock signal from the device clock will interfere with wireless communication of the device;
   in response to determining that the first serial interface clock signal from the device clock will interfere with wireless communication of the device:
      waiting for a first low power state of the serial interface;
      switching from providing the first clock signal from the first clock to the serial interface to providing a second clock signal from a second clock to the serial interface at a second time after the first low power state, wherein, at the second time, the serial interface generates a second serial interface clock signal based on the second clock signal from the second clock;
      modifying a frequency of the first clock signal to produce a modified first clock signal, wherein said modifying is performed while the second clock signal is provided from the second clock to the serial interface;
      waiting for a second low power state of the serial interface;
      switching from providing the second clock signal from the second clock to the serial interface to providing the modified first clock signal from the first clock to the device clock at a third time after the second low power state, wherein, at the third time, the serial interface generates a third serial interface clock signal based on the modified first clock signal, wherein the third serial interface clock signal has reduced interference with wireless communication of the device.

23. The method of claim 22, wherein the serial interface comprises a high speed serial interface (HSSI).

24. The method of claim 22, wherein, in response to determining that the first serial interface clock from the device clock will interfere with wireless communication of the device, the method further comprises:
   waiting for a vertical sync of a display of the wireless device;
   wherein said waiting for the first low power state is performed after the vertical sync of the display of the wireless device.

25. The method of claim 22, wherein said switching and said switching is performed utilizing a glitcheless mux.

* * * * *